(12) United States Patent
de Larminat et al.

(10) Patent No.: US 7,239,168 B2
(45) Date of Patent: Jul. 3, 2007

(54) CURRENT SENSING IN A TWO-PHASE MOTOR

(75) Inventors: Ronan de Larminat, Northbrook, IL (US); Alexander Kurnia, Buffalo Grove, IL (US); Guang Liu, Lake Zurich, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 14 days.

(21) Appl. No.: 11/355,708

(22) Filed: Feb. 16, 2006

(65) Prior Publication Data

US 2006/0125513 A1    Jun. 15, 2006

Related U.S. Application Data

(62) Division of application No. 10/889,490, filed on Jul. 12, 2004, now Pat. No. 7,109,742.

(51) Int. Cl.
*G01R 31/34* (2006.01)

(52) U.S. Cl. .................. 324/772; 324/545; 324/546

(58) Field of Classification Search .............. 324/772, 324/545, 546; 322/17, 99; 702/64; 318/138, 318/254, 439, 902, 490, 491
See application file for complete search history.

(56) References Cited

U.S. PATENT DOCUMENTS 5,274,317 A    12/1993   Utley et al.
5,321,342 A    6/1994    Kruse
5,719,519 A    2/1998    Berringer
6,445,155 B1   9/2002    Williams et al.
6,735,537 B2   5/2004    Liu et al.
6,946,814 B2 * 9/2005    Takemori et al. .......... 318/685
7,023,171 B2 * 4/2006    Su et al. .................... 318/801
7,193,388 B1 * 3/2007    Skinner et al. ............ 318/811

FOREIGN PATENT DOCUMENTS

EP    0195318 B1   10/1990
JP    05316795 A   11/1993
JP    11289797 A   10/1999

* cited by examiner

*Primary Examiner*—Ha Tran Nguyen
*Assistant Examiner*—Arleen M. Vazquez
(74) *Attorney, Agent, or Firm*—Terri S. Hughes; Gary J. Cunningham (57) ABSTRACT

A method and apparatus for measuring current by a single sensor for two motor phases driven by first and second set of switches to drive respective first and second phases of a motor under control of PWM signals. A first step 100 includes reading a duty cycle of each winding drive current. A next step configures 104, 110, 114, 116, 118 the PWM signals to provide at least one timing window wherein at least of one of the windings of the motor is being driven while the other winding is not being driven, and to provide a relative timing offset of approximately one-half cycle between the pulse width modulation signals driving a first winding and a second winding of the motor. A next step 90 includes gating the switches with the configured PWM signals. A next step 95 includes sampling the current of the at least one of the windings with a single sensor.

6 Claims, 8 Drawing Sheets

FIG. 1

| Sah,Sal | Sbh, Sbl | Sch, Scl | Sdh, Sdl | W1 VECTOR | W2 VECTOR | I_DC_LINK |
|---|---|---|---|---|---|---|
| Sah=open Sal=closed | Sah=open Sal=closed | Sch=open Scl=closed | Sdh=open Sdl=closed | 00 | 00 | OFFSET |
| Sah=open Sal=closed | Sbh=closed Sbl=open | Sch=open Scl=closed | Sdh=open Sdl=closed | 01 | 00 | -i1 |
| Sah=closed Sal=open | Sah=open Sal=closed | Sch=open Scl=closed | Sdh=open Sdl=closed | 10 | 00 | i1 |
| Sah=closed Sal=open | Sbh=closed Sbl=open | Sch=open Scl=closed | Sdh=open Sdl=closed | 11 | 00 | OFFSET |
| Sah=open Ssl=closed | Sah=open Sal=closed | Sch=open Scl=closed | Sdh=closed Sdl=open | 00 | 01 | -i2 |
| Sah=open Sal=closed | Sbh=closed Sbl=open | Sch=open Scl=closed | Sdh=closed Sdl=open | 01 | 01 | -i1-i2 |
| Sah=closed Sal=open | Sah=open Sal=closed | Sch=open Scl=closed | Sdh=closed Sdl=open | 10 | 01 | i1-i2 |
| Sah=closed Sal=open | Sbh=closed Sbl=open | Sch=open Scl=closed | Sdh=closed Sdl=open | 11 | 01 | -i2 |
| Sah=open Sal=closed | Sah=open Sal=closed | Sch=closed Sal=open | Sdh=open Sdl=closed | 00 | 10 | i2 |
| Sah=open Sal=closed | Sbn=closed Sbl=open | Sch=closed Scl=open | Sdh=open Sdl=closed | 01 | 10 | -i1+i2 |
| Sah=closed Sal=open | Sah=open Sal=closed | Sch=closed Scl=open | Sdh=open Sdl=closed | 10 | 10 | i1+i2 |
| Sah=closed Sal=open | Sbh=closed Sbl=open | Sch=closed Scl=open | Sdh=open Sdl=closd | 11 | 10 | i2 |
| Sah=open Sal=closed | Sah=open Sal=closed | Sch=closed Scl=open | Sdh=closed Sdl=open | 00 | 11 | OFFSET |
| Sah=open Sal=closed | Sbh=closed Sbl=open | Sch=closed Scl=open | Sdh=closed Sdl=open | 01 | 11 | -i1 |
| Sah=closed Sal=open | Sah=open Sal=closed | Sch=closed Scl=open | Sdh=closed Sdl=open | 10 | 11 | i1 |
| Sah=closed Sal=open | Sbh=closed Sbl=open | Sch=closed Scl=open | Sdh=closed Sdl=open | 11 | 11 | OFFSET |

CURRENT SENSING IN A TWO-PHASE MOTOR

The present application is a divisional application of, and claims priority and full benefit under 35 U.S.C. § 120 of previous U.S. patent application Ser. No. 10/889,490, for "Current Sensing In A Two-Phase Motor", filed Jul. 12, 2004 now U.S. Pat. No. 7,109,742, and assigned to Motorola, Inc., and which is incorporated herein by reference in its entirety.

FIELD OF THE INVENTION

This invention in general relates to two-phase power devices (such as two-phase motors) and, more particularly, to an improved procedure for measuring the currents in each phase of a two motor phases via a single current sensor.

BACKGROUND OF THE INVENTION

A two-phase motor (such as a permanent magnet synchronous motor and induction motor) can be used in many applications to provide power assistance to mechanical systems. It is known to control the phase winding voltages in a two-phase motor using pulse width modulated signals. The pulse width modulated signals are applied to an inverter or a series of switching devices that connect the phase windings of the motor to a positive and negative terminal of a direct current (DC) power supply, such as a battery. This inverter consists of four switches in an upper bank and four switches in a lower bank.

To adequately control the motor and minimize torque ripple, it is necessary to measure the current flowing through each phase winding. The current measured in each phase is provided to a controller that generates the pulse width modulated signals. To measure currents, it is known to use a resistor in series with each phase winding. The voltage drop across each resistor is measured to determine the current flowing for each phase. This type of system has the disadvantage of requiring two current sensors, one for each of the two phase windings, and two measurement circuits. These existing configurations use either Hall Effect sensors or shunts, which are expensive. Moreover, Hall Effect sensors have differing response characteristics due to sensor accuracy, amplification offset, gain and linearity, and temperature and aging drift, which will cause a mismatch between the two current channels which generates torque ripple. This is also true for shunts or any other current sensor that requires an amplification stage. Further, there is an issue with common-mode noise rejection in two-phase motors that is not addressed.

It is also known to use a single resistor to perform the function of measuring the current through each phase of a Y-connected three-phase motor. The single resistor is located external to the motor windings on the DC link between the DC power supply and the inverter or series of switching devices. Depending on the states of the switches and period of operation, the currents through the phases may be measured or calculated by the single resistor. Specifically, in a Y-connected three-phase motor, the sum of all currents flowing through all phases of the motor are zero, so by knowing the current flowing through one or two phases a determination of the current flowing through the remaining phase(s) may be made (with the exception of Y-connected motors with a grounded center point or a motor with a fault). However, this solution is not applicable to two-phase motors without a common winding connection.

It is also known to close either the upper bank of switching devices or the lower bank of switching devices, thereby recirculating the current in the windings of the motor together when damping or braking is required. Braking is used to damp unwanted mechanical system oscillations and is also used to reduce the speed of the mechanical system. For example, mechanical resonances or disturbances may feed back into the motor from the mechanical system. Not only are unstable mechanical resonances undesired by themselves, these resonances can generating an electromotive force (EMF) that can result in excess current in the motor. In damping mode, the closed switches allow current to circulate within the motor windings to act as a brake to oppose any motion induced by the mechanical resonances, thereby helping to restore stability. However, the internal circulation of currents within the motor windings in this mode cannot be measured by a single external resistor since the resistor is not in a current carrying loop. Therefore, the currents within the motor windings cannot be measured, and therefore cannot be modified or controlled.

Recent advances in digital signal processors (DSPs) have permitted the use of more advanced pulse width modulation schemes such as space vector pulse width modulation (hereinafter "SVPWM"). One significant advantage of using SVPWM in a 3-phase system is that it can provide more output voltage compared to conventionally known sinusoidal pulse width modulation schemes. The drawback, however, is that SVPWM requires more complex schemes to generate PWM signals applied to the inverter. The main challenge into measuring full phase currents via a single DC link current sensor is that there are situations where the full phase currents cannot be sampled during SVPWM operation. One situation is when the amplitude of the voltage space vector is very small. Another situation is when the voltage space vector falls on the other active vector.

Therefore, a need exists for an improved technique to monitor current in a two-phase device, using a single current sensor. It would also be of benefit if common-mode noise rejection can be provided. Further, it would be desirable to provide this technique with no additional hardware requirements, thereby improving reliability and saving cost.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the broad scope of the invention as defined by the appended claims.

DETAILED DESCRIPTION OF THE PREFERRED EMBODIMENTS

What is described is an improved procedure for measuring the electric current flowing through each phase of a two-phase device in a system, using a single external current sensor. Advantageously, no additional hardware is needed to implement the invention. Because the sensor is located in the DC link current path, there is no common-mode noise rejection issue. Two-phase motors, such as permanent magnet synchronous motors, may be used as part of a powered mechanical system. For purposes of illustration and description, an example of an application of the procedure for a two-phase motor for automotive uses will be used. Two-phase motors, such as permanent magnet synchronous motors, may be used as part of a power steering system in an automobile. The present invention, however, is not limited to two-phase motors and may be applicable to other two-phase devices or even multi-phase devices not sharing a common winding connection, such as two DC motors, for example.

Figure 1:
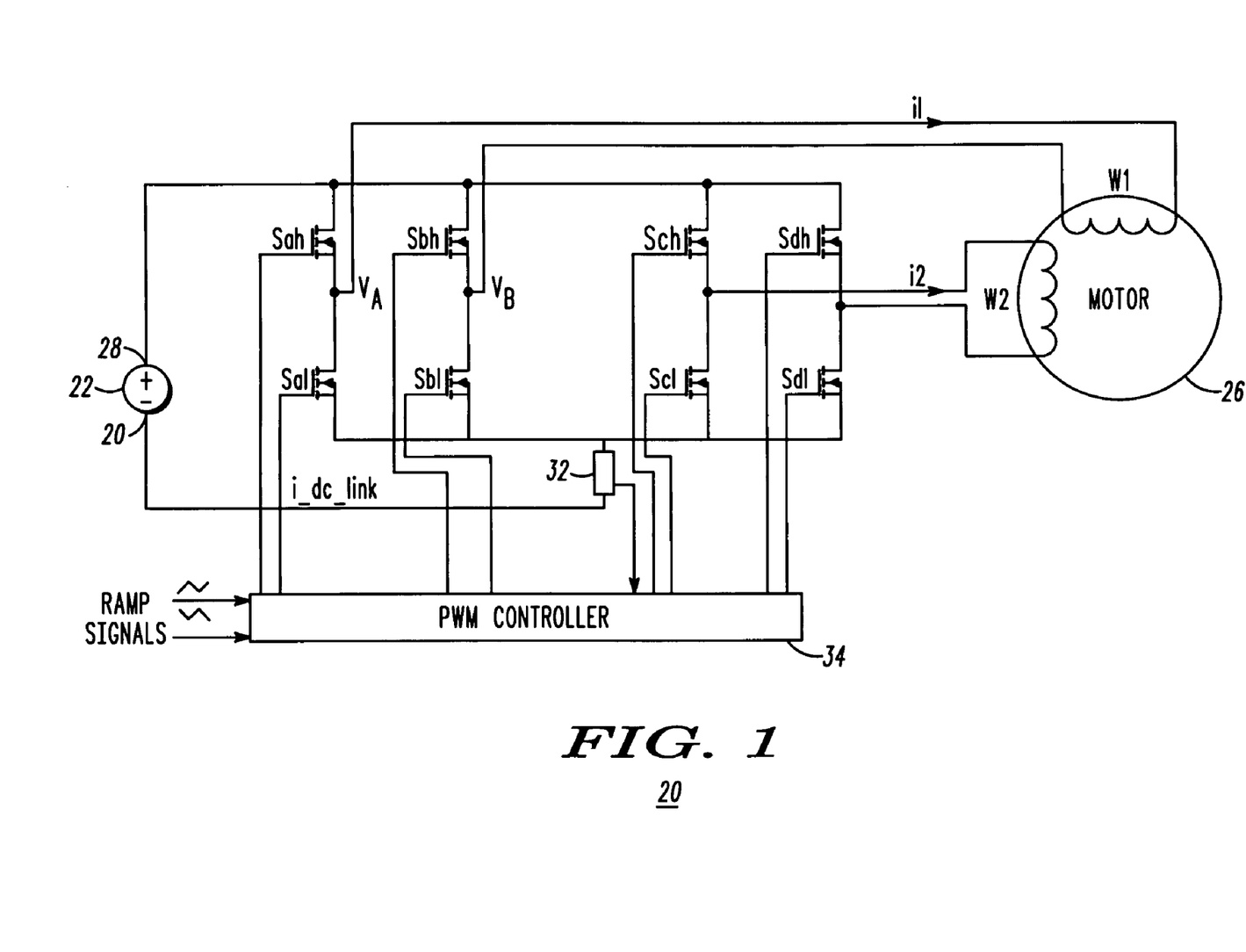
FIG. 1 is a diagram of a system having a power source, an inverter or switching circuit, and a two-phase motor, in accordance with the present invention.

Now, turning to the drawings, an example use of a system for a two-phase motor will be explained. Referring to FIG. 1, there is a system 20 having generally a power source 22, an inverter or switching circuit 24, and a motor 26. For automotive use, the power source 22 may be an automobile DC battery having a positive terminal 28 and a negative terminal 30. The negative terminal 30 may also be a ground connection. The motor 26 may be a motor having two uncoupled phase windings W1 and W2 driving the motor ninety degrees out of phase, although it should be recognized that each winding may include a plurality of poles and could also drive the motor at various angular relationships. It should also be recognized that the present invention can also be applied to multiple winding motors not sharing a common connection or neutral. Such motors may include, for example, a permanent magnet synchronous motor or an induction motor.

The inverter or switching circuit 24 includes four sets of switching devices, one set for each end of each phase winding of the motor 26. A first set of switching devices Sah (switch A high), Sal (switch A low) are capable of providing a voltage Va to one side the first phase winding W1, and a second set of switching devices Sbh (switch B high), Sal (switch B low) are capable of providing a voltage Vb to the other side the first phase winding W1. The drive to winding W1 is then Va−Vb, or Vab. Similarly, a third set of switching devices Sch (switch C high), Scl (switch C low) are capable of providing a voltage Vc to one side the second phase winding W2, and a fourth set of switching devices Sdh (switch D high), Sdl (switch D low) are capable of providing a voltage Vd to the other side the first phase winding W2. The drive to winding W2 is then Vc-Vd, or Vcd. Both upper and lower devices on the same inverter leg are not allowed to turn-on simultaneously to prevent shoot-through current. For example, Sah (switch A high) and Sal (switch A low) are never turned on together. Typically, the amplitude of Va and Vc (or Vb and Vd) is about V_batt when the corresponding upper device is turn-on and 0V when the corresponding lower device is turn-on. Therefore, the amplitude of Vab and Vcd are about either V_batt or zero volts. The amplitude of Vab and Vcd shown in the figures is just an example. For a 2-phase AC motor, the 2 windings have been driven by sinusoidal voltages.

Each set of switching devices has an upper bank of switching device Sah, Sbh, Sch, Sdh connected to the positive terminal 28 of the power source 22 and a lower bank of switching device Sal, Sbl, Scl, Sdl connected to the negative terminal 30 of the power source 22. Each switching device is independently driven by a PWM controller 34. The opening and closing of switching devices within each set allows each end of phase winding W1 and W2 of the motor 26 to be connected to a positive terminal 28 or a negative terminal 30 of the power supply 22. This permits a voltage Vab or Vcd to be applied to a corresponding phase winding W1 or W2 of the motor 26, respectively. The current flowing through each phase winding W1 or W2 is represented in FIG. 1 by a corresponding variable i1 or i2, respectively.

As will be explained in more detail below, the present invention uses SVPWM signals to control the switching devices. The PWM controller 34 is used to generate a PWM signal to each of the switching devices. The controller 34 generates the PWM signal based on the current measurements provided by a current sensor 32. It should be recognized that the current sensor 32 can be associated with amplifiers, sample & hold circuitry, analog-to-digital converters, and the like in order to provide an analog or digital signal to the controller indicating a current in the measured phase of the motor 26. The controller 34 can include a digital processor and memory to store software having control algorithms. The digital processor supplies the PWM signals based the control algorithms implemented in software. A suitable controller 34 having a digital processor for the present invention may be obtained from Motorola, Inc. as part of the 56F83xx family, for example. The part is a digital signal processor (DSP) controller that includes flash memory to store software. Alternatively, the controller 34 could include a DSP processor with an external memory (not shown).

A variety of switching devices can be used for the switching circuit 24. For example, the switching devices can be power transistors such as IGBT, power MOSFET, and bipolar transistor. The PWM signals would then be applied to the gates or bases of the power transistors. What is important is that each switching device is capable of being opened or closed (or turned off or on) by applying a PWM signal. The switches are generally controlled by a PWM signal but most important, they are generating the PWM phase voltage to the motor windings.

To adequately control the motor 26 and minimize torque ripple, the currents for variables i1 and i2 need to be measured or otherwise known. In one embodiment, the single current sensing device 32 is positioned on the DC link between the power supply 22 and the switching circuit 24. In particular, the current sensing device 32 is located between the lower switching devices Sal, Sbl, Scl, Sdl of the switching circuit 24 and the negative terminal 30 of the power supply 22. The current sensing device 32 may be a sensor that measures the voltage drop across a resistor. The current sensing device 32 may be capable of converting the measured voltage drop to a current (represented by i_dc_link) through the DC link according to well-known methods. The current sensor 32 can be on the negative rail (as shown) or on the positive rail. Alternatively, the measured voltage drop from sensor 32 may be provided to the controller 34 and the controller 34 may convert the sensed voltage drop to a current.

Each switching device within a high and low set of switching devices is complementary to the other switching device. For example, voltage Va at one end of winding W1 may either be ON, by directing switch Sah to conduct while directing Sal to stop conducting, or OFF by directing switch Sah to stop conducting while directing Sal to start conducting. Voltage Vb, Vc and Vd are controlled in the same manner. However, all of the voltages Va, Vb, Vc and Vd can be operated independently of each other.

For a two-phase motor system, this results in sixteen possible switching states. The table illustrated in FIG. 2 reflects the sixteen possible switching states as vectors. The first column in the table represents the states (open/closed) of the first set of switching devices Sah, Sal. The second column in the table represents the states (open/closed) of the second set of switching devices Sbh, Sbl. The third column in the table represents the states (open/closed) of the third set of switching devices Sch, Scl. The fourth column in the table represents the states (open/closed) of the third set of switching devices Sdh, Sdl. The fifth and sixth columns reflect the sixteen vector states. The seventh column reflects the relationship between the current through the DC link (i_dc_link) and the currents i1 and i2 through the phase windings W1 and W2. Out of the sixteen possible switching states, there are twelve active vector states where current will flow through the DC link and four zero vector states (0000, 1100, 0011, 1111) where little or no current will flow through the DC link and only a DC offset current will be registered. As can be seen there are many motor drive states where the individual current for Winding W1 or W2 can not be measured on the DC link, but only a combination of the two. For example, vector 1001 includes a combination of i1−i2.

The present invention uses PWM signals to control the states of the switching devices. By controlling the states of the switching devices, desired phase voltages may be applied to the phase windings W1 and W2 of the motor.

Figure 3:
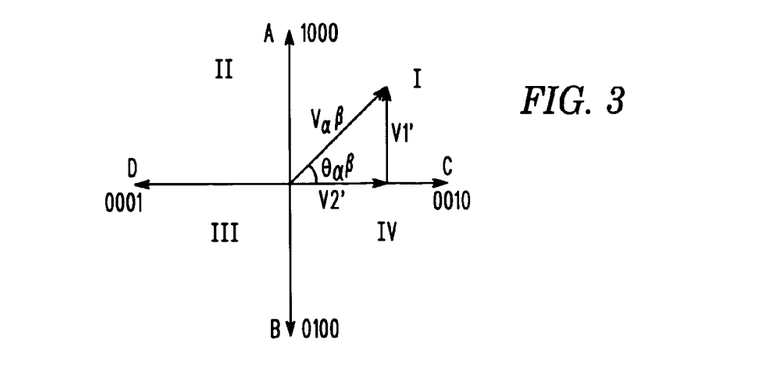
FIG. 3 is a voltage space vector diagram of FIG. 2.

FIG. 3 shows a typical inverter voltage space vector diagram for PWM operation. The vector diagram is divided into four sectors I-IV. When the inverter or switching circuit is driving the motor, the voltage space vector $V_{\alpha\beta}$ will rotate at the same speed as the motor. A voltage space vector will fall within one of the sectors or fall on one of the active vectors. If the voltage space vector falls within a sector, two adjacent vectors are chosen. For example, FIG. 3 illustrates a voltage space vector $V_{\alpha\beta}$ falling within sector I. The voltage space vector $V_{\alpha\beta}$ can be represented by two adjacent vectors V1' and V2' in the following relations:

$$V_{\alpha\beta}=V1'+V2' \qquad (1)$$

$$V1'=V1*(t1/Tp) \qquad (2)$$

$$V2'=V2*(t2/Tp) \qquad (3)$$

In the above relations, t1 is a first time period during which vector V1 is applied; t2 is a second time period during which vector V2 is applied; and Tp is a full pulse width modulated cycle or period (typically fifty microseconds). The amplitude of the voltage space vector $V_{\alpha\beta}$ can be described by a modulation index.

Figure 4:
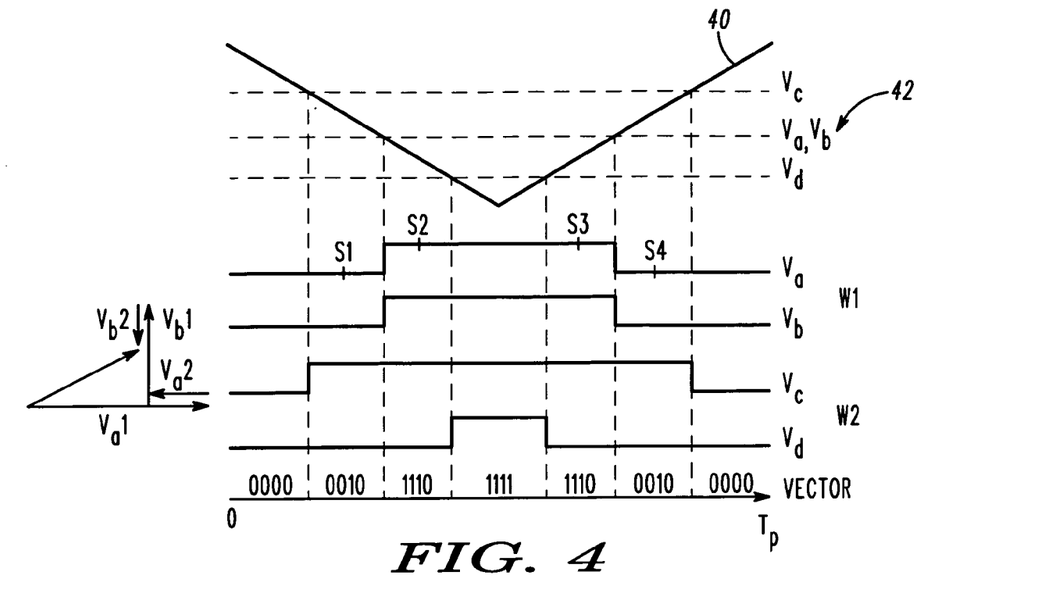
FIG. 4 is a graphical representation of a prior art PWM switching scheme for a two-phase motor.

Referring to FIG. 4, a timing diagram is shown for naturally symmetric PWM signals. Each timing diagram shows the voltage pulse trains applied to the switching devices to produce voltages Va, Vb, Vc, Vd on the windings W1, W2 of the motor that correspond to the two phases of the motor over a single pulse width modulation cycle or period Tp. The pulse timing can be driven by a simple ramp signal 40 that operates on various thresholds 42. For example, a Vc threshold on a downward ramp signal will apply the voltage Vc, and the same Vc threshold on an upward ramp signal will remove the voltage Vc. Thresholds Va, Vb and Vd work similarly in this symmetric manner. In this example, winding W1 is idle across the period, i.e. Vab=0 (Va−Vb=0), and winding W2 is being driven by a positive voltage Vcd over two quarters of the period Tp.

In pulse width modulation schemes, the pulse width modulated signal is not constant. Rather, the signal is on for a part of the period and off for another part of the period. In FIG. 4, the high state of the voltage pulse train indicates that an upper switching device Sah, Sbh, Sch, Sdh is closed (and a corresponding lower switching device Sal, Sbl, Scl, Sdl is open by a corresponding opposite voltage pulse train (not shown)). The low state of the voltage pulse train indicates that an upper switching device Sah, Sbh, Sch, Sdh is open (and a corresponding lower switching device Sal, Sbl, Scl, Sdl is closed by a corresponding opposite voltage pulse train (not shown)). The patterns of the voltage pulse trains are symmetrical to a center axis that represents a half pulse width period tp.

Figure 5:
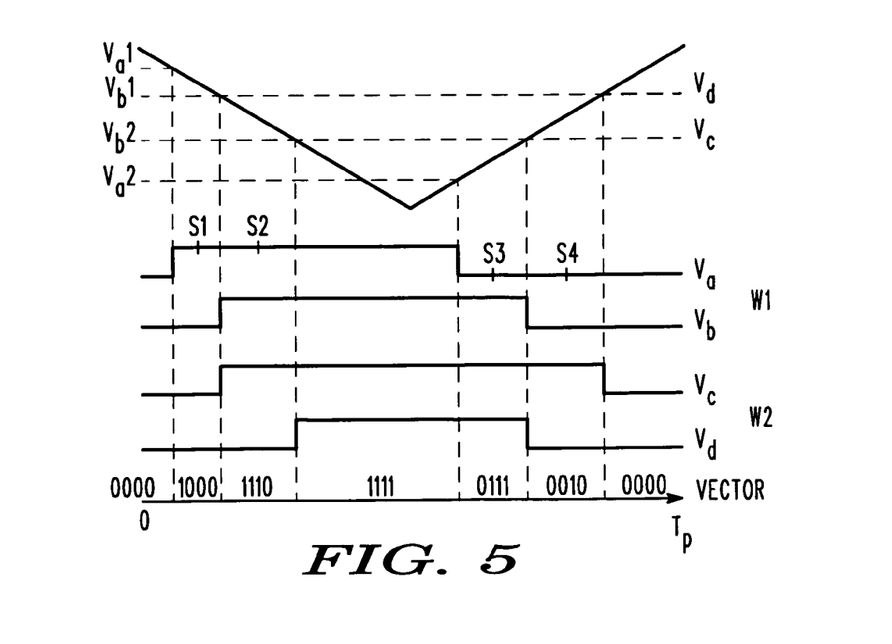
FIGS. 5-10 are graphical representation of various PWM embodiments, in accordance with the present invention.

At the bottom of FIG. 4, the corresponding vectors (from FIG. 2) are shown. In this example, any of sample points S1-S4 can be taken to determine current i2 in winding W2 (at vector 0010 or vector 1110), but it is not possible to independently find the current i1 in winding W1 inasmuch as none of the vectors contain i1 solely. Indeed, during the vectors 0000 and 1111 there is no current is passing through DC link (zero vector states). However, in half the time period Tp the active vector V2 is applied. In other words, a current will pass through the DC link during the vectors 00010 and 1110. If the time period of vector 0010 or 1110 is sufficiently long enough, a current through the corresponding winding may be measured or sampled (S1-S4). Typically, the time period necessary to obtain an accurate sample measurement is about two microseconds, preferably taken in the middle of the pulse width. Therefore, a sampling window of about four microseconds is desired FIG. 5 shows one solution to the problem of obtaining both i1 and i2 measurements involving shifting of the pulse train. This can be accomplished by manipulating then switching thresholds for Va and Vb during the PWM cycle as shown. For example, threshold Va1 is used to apply voltage Va, and threshold Va2 is used to remove voltage Va. Similarly, threshold Vb1 is used to apply voltage Vb, and threshold Vb2 is used to remove voltage Vb. In this case, a sample S1 can be taken during vector 1000 (or sample S3 during vector 0111) to determine i1 and samples S2 or S4 can be taken to determine i2 as before. However, it is very difficult to manage the four PWM outputs and changing thresholds in this solution.

Figure 6:
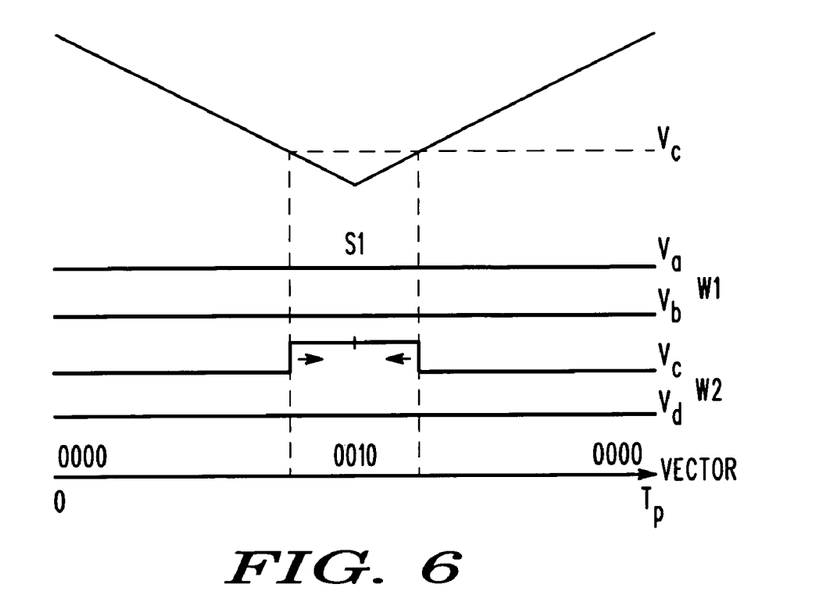
Figure 7:
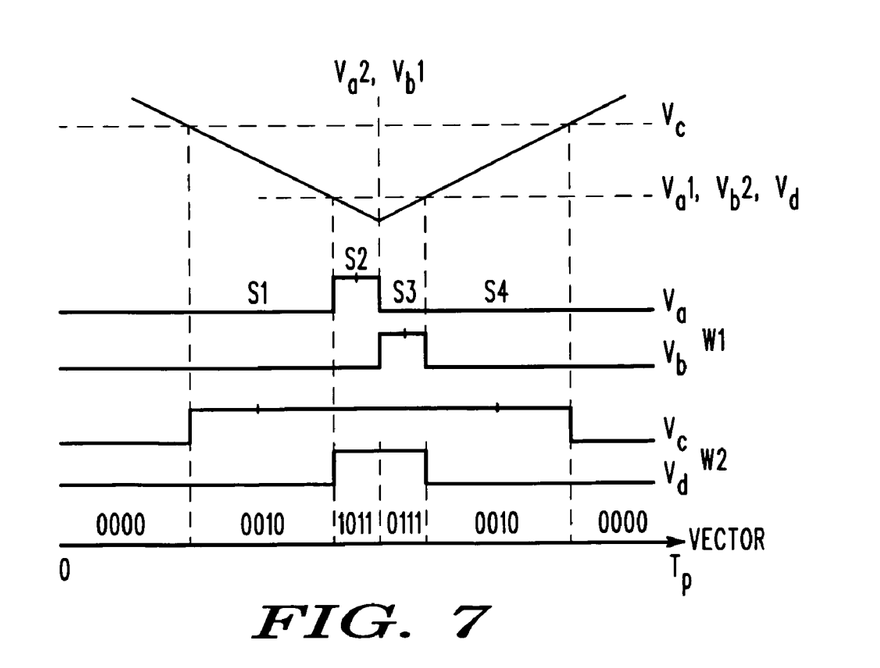

FIGS. 6 and 7 show a further solution to mitigate the problems inherent in the solution of FIG. 5, by using a phase grounding approach (FIG. 6) and then introducing small active states (FIG. 7) for measurement. Phase grounding is to choose vector 0000 for zero-vector synthesis by turning-on the corresponding lower devices. The advantage of this is the reduction of switching and the switching losses inherent therein. In addition, any coupling interaction between windings is reduced and there is no need to use a gate drive with 100% duty cycle capability. As shown in FIG. 6 (and referencing FIG. 4), the only non-zero active vector is Vc. Other vectors Va, Vb and Vd are zero vectors. As a result, Va, Vb and Vd are at virtual grounds (i.e. phase grounding), but the drive to the motor is essentially the same as shown in FIG. 4. However, it is still necessary to change switching thresholds during the PWM cycle. Therefore, it is desirable to merge the Vc ON states into one (arrows), wherein a single Vc threshold can be maintained for the ramp signal, and the amount of switching is minimized. As before, i2 can again be sampled at S1, but i1 still can not be sampled.

Figure 2:
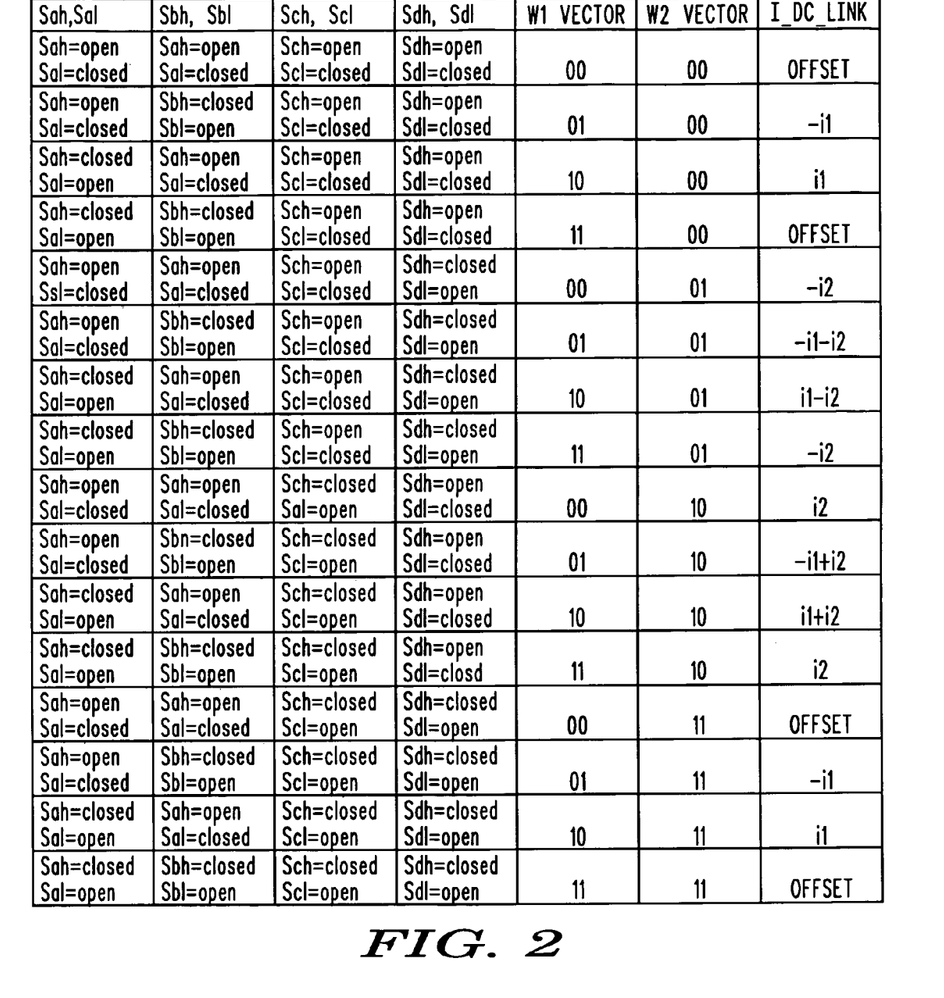
FIG. 2 is a table reflecting the different possible switching states of the switches of FIG. 1.

After phase grounding, one or more vectors can be artificially introduced to measure i1 as shown in FIG. 7. In this case two vectors are introduced within the 0010 vector (resulting after the merging of the Vc ON states) of FIG. 6. The two introduced vectors are of a minimal time period (e.g. four microseconds) that is sufficient to provide an accurate measurement. As shown for sample S2, Va is turned on (Vb off) to drive a current i1 through W1 so that a sample can be measured. However, as shown in FIG. 2, just turning Va ON would result in a 1010 vector, which does not isolate i1. However, it can be noticed that a 1011 vector will isolate i1 for measurement. Therefore, Vd can be turned on for the sample S2. This can be done as long as the Vc ON time is spread out such that the total ON time for Vcd (Vc–Vd) remains the same. During sample S2 current +i1 is introduced into winding W1. In order to balance this out, so that an intended average Vab=0 state is maintained through the cycle, an equivalent –i1 current is introduced (shown as sample S3). In this case, Va is switched OFF (by the change from a downward to upward ramp indication), Vb is switched ON (also by the change from a downward to upward ramp indication), while Vd is left ON, with the resulting 0111 vector providing a –i1 current in winding W1. As a result, i1=(S3+S2)/2. As long as Vcd is ON for the same amount as FIGS. 4 and 6, this representation is substantially equivalent. Samples S1 or S4 can be used as before to measure i2. However, in this example it should be noted that there is much sampling and switching to be done during a very short time, which can introduce coupling effects between windings and switching problems.

Figure 8:
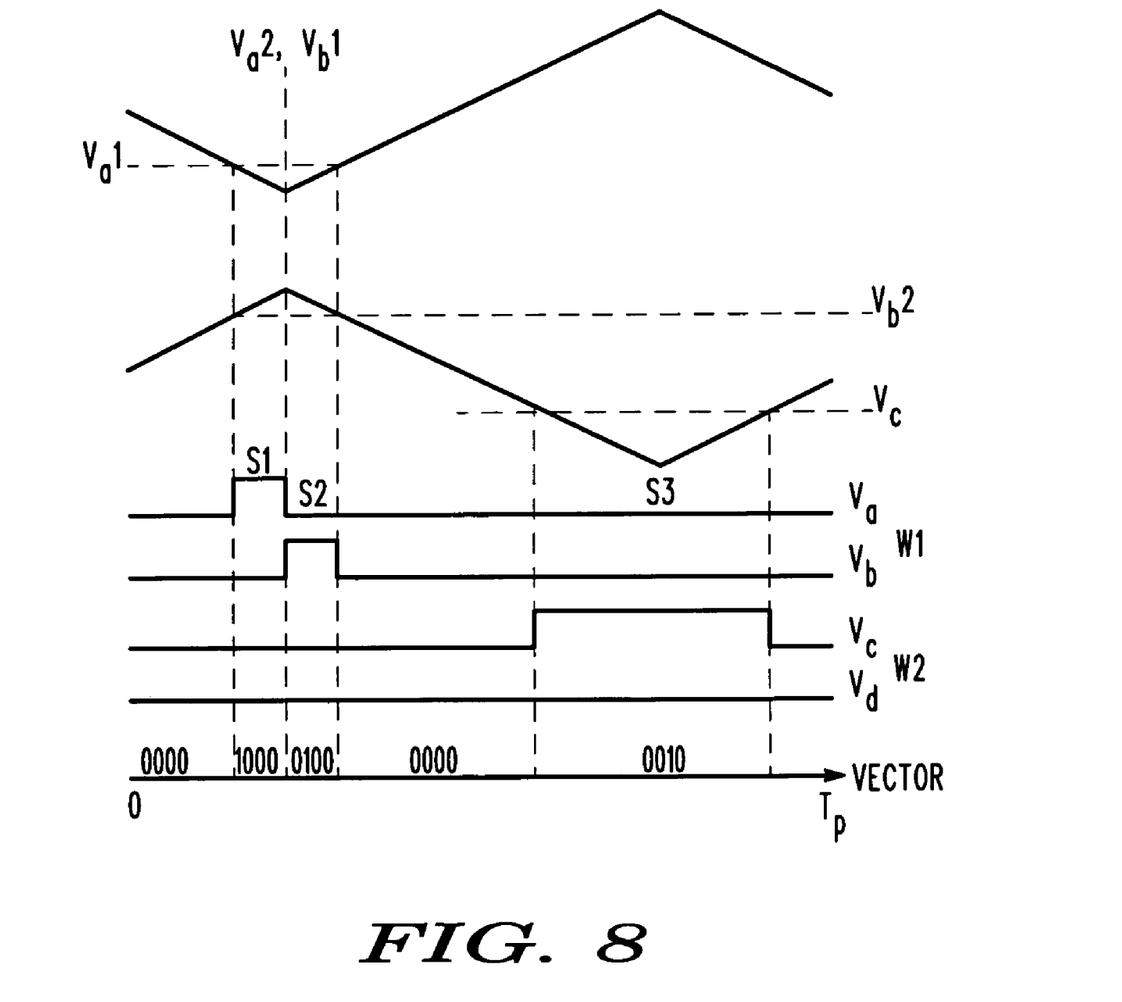
Figure 9:
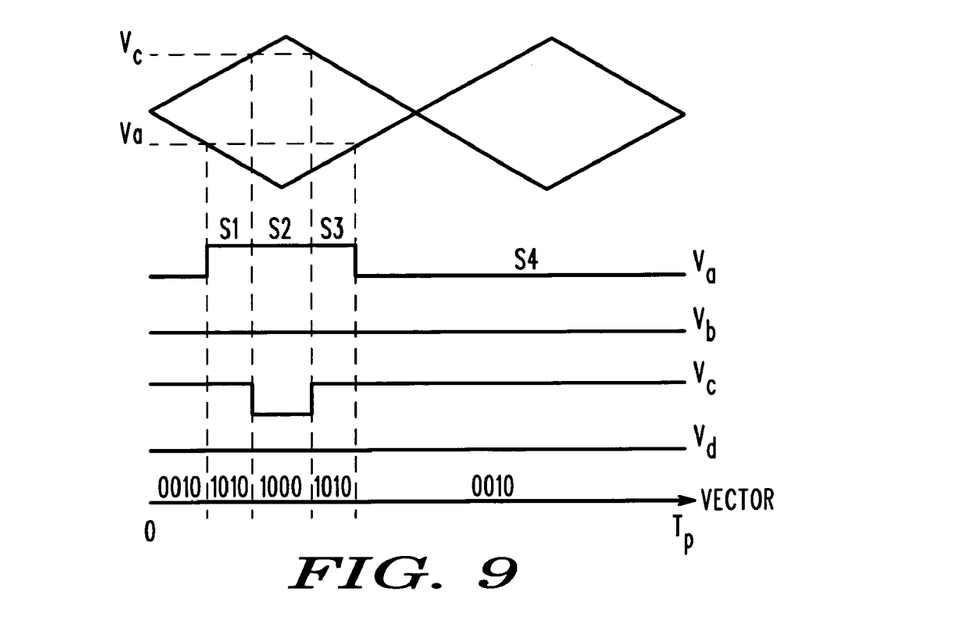

Therefore, in a preferred embodiment, the active states and sampling between the windings are removed from each other. This can be done by providing two PWM ramp signals that are separated by 180 degrees, as shown in FIG. 8. This embodiment has several advantages. First, only one W2 active vector is needed which reduces switching losses. Second, the active states are well separated which not only reduces potential winding coupling, but also leaves room for the active vectors to widen (as motor drive requires) without interacting, i.e. increase dynamic range. In addition, the sampling points can remain fixed. As a result, this embodiment provides accurate two-phase motor measurements with a single current sensor for all the light and medium duty-cycle requirements for a two-phase motor. Although the special case of an average Vab=0 is shown (W1 is substantially idle), it should be recognized that if W1 is being driven, which is the typical case, then i1 can still be easily measured away from i2 (as represented in FIG. 9 below) as long as the W1 and W2 states do not overlap. In heavy load requirements, the active states of the windings may extent to most or all of the duty cycle of the PWM cycle, i.e. the drive voltage to one or both windings may be forced ON for most or all of the PWM cycle causing the active states to overlap. In this case, the solution of FIG. 8 may not be able to provide the isolated current measurement of each winding.

FIG. 9 shows the two-phase motor under heavy load with overlapping active states (both ramps shown together). In the example shown, W2 is being driven for a large majority of the duty cycle. As long as W2 is off for a sufficient amount of time for sample S2 (at least four microseconds), then i1 can be accurately measured during vector 1000, and i2 can be measured anytime during sample S4. However, if the period for sample S2 is less than sufficient (e.g. four microseconds), then an accurate measurement for i1 can not be made. However, even in this heavy load embodiment, the present invention provides a technique where i1 can still be determined. Specifically, the sum current of i1+i2, due to applied vector 1010, can be measured at either sample point S1 or S3. Since i2 can be determined at S4, i1 can then be calculated from i1=S1–S4 or i1=(i1+i2)–i2.

It should be noted it is undesirable for both motor windings to be driven at 100% duty cycle as motor saturation occurs and the PWM system can no longer provide proper control of the motor. Therefore, it is preferred that the motor control algorithm will limit voltage output to guarantee that both active voltage vectors cannot be at 100% duty cycle. Specifically, the system provides that at least one of the windings will be driven at less than 100%, and preferably 100%–the minimum sampling window (i.e. fifty microseconds–four microseconds=forty-six microseconds), which will be referred herein after as Wmax. The minimum sampling window will hereinafter be referred to as Wmin.

Figure 10:
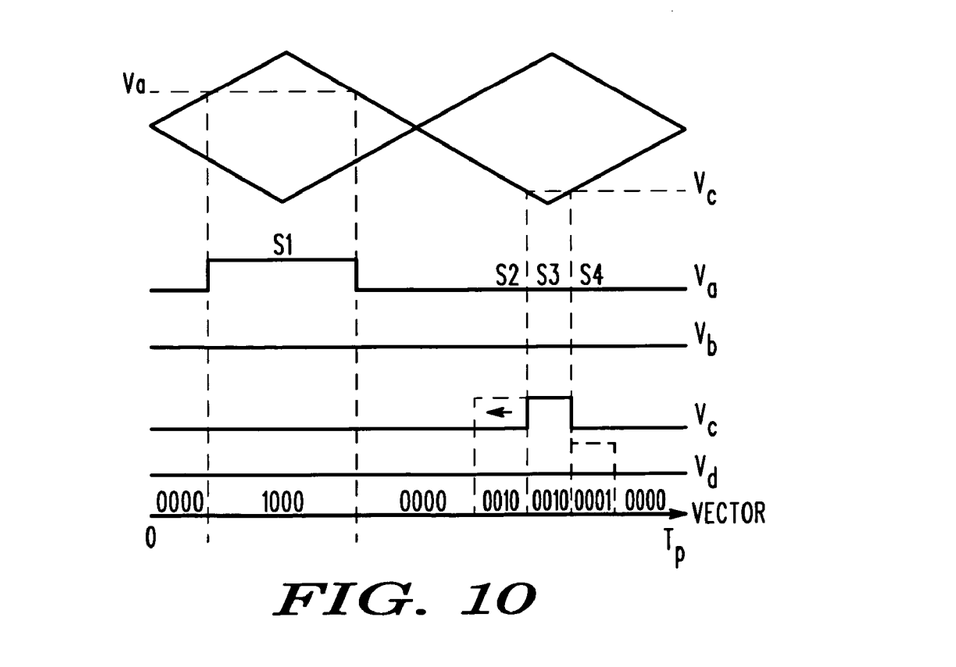

Similarly, problems may occur when using PWM signals if the time periods for either (or both) of the sample periods for the active vectors are very small or nonexistent. When the sample periods for the active vectors are very small or nonexistent, the system is not able to measure the currents through at least two phases of the windings in the motor. FIG. 10 shows the very-light load case where one of the windings is powered for a very short time (e.g. less than four microseconds), wherein an accurate sample can not be obtained. In this case something similar to the embodiment for FIG. 7 can be used wherein one of the vectors (0010) is widened while an artificial vector (0001) is introduced, by driving Vd, to balance out the current inequity caused by widening the short vector.

For the example shown in FIG. 10, if it is assumed that the Vc ON time for active state vector 0010 is only three microseconds, then it is known that an accurate sample for S3 can not be obtained. One solution would be to spread the Vc ON time for another one microsecond (arrow) and apply a balancing one microsecond Vd On time (shown as sample S4. However, it is very difficult to control a one microsecond pulse in the PWM system. It is preferred that Vd ON time is also at least four microseconds for better control. This then requires that the sample S3 be spread not an addition one microsecond, but an additional four microseconds (seven microseconds total). Not only does this provide more stable operation, the presence of the new 0010 and 0001 vectors allows at least two samples (S2, S4) to be taken and averaged for a more consistent measurement result for current i2.

As can be realized, there are many possible scenarios for driving a two-phase motor relating to the active vectors for W1 and W2. Accordingly, the present invention takes into account these different cases. As explained in more detail below, depending on the specific case, the PWM signals are applied in certain ways to allow a sufficient sampling window (or time period) for measuring a current across the sensor on the DC link. In order to ensure sufficient sampling window for valid DC-link current measurement, each case is identified and then appropriate shifts or modifications to the PWM signals are made by the controller of the system based on the identified case.

In all of the above embodiments, the 0000 vector or zero voltage vector can be measured for zero-amp calibration and to take into account resistor and amplifier temperature coefficient drift.

Figure 11:
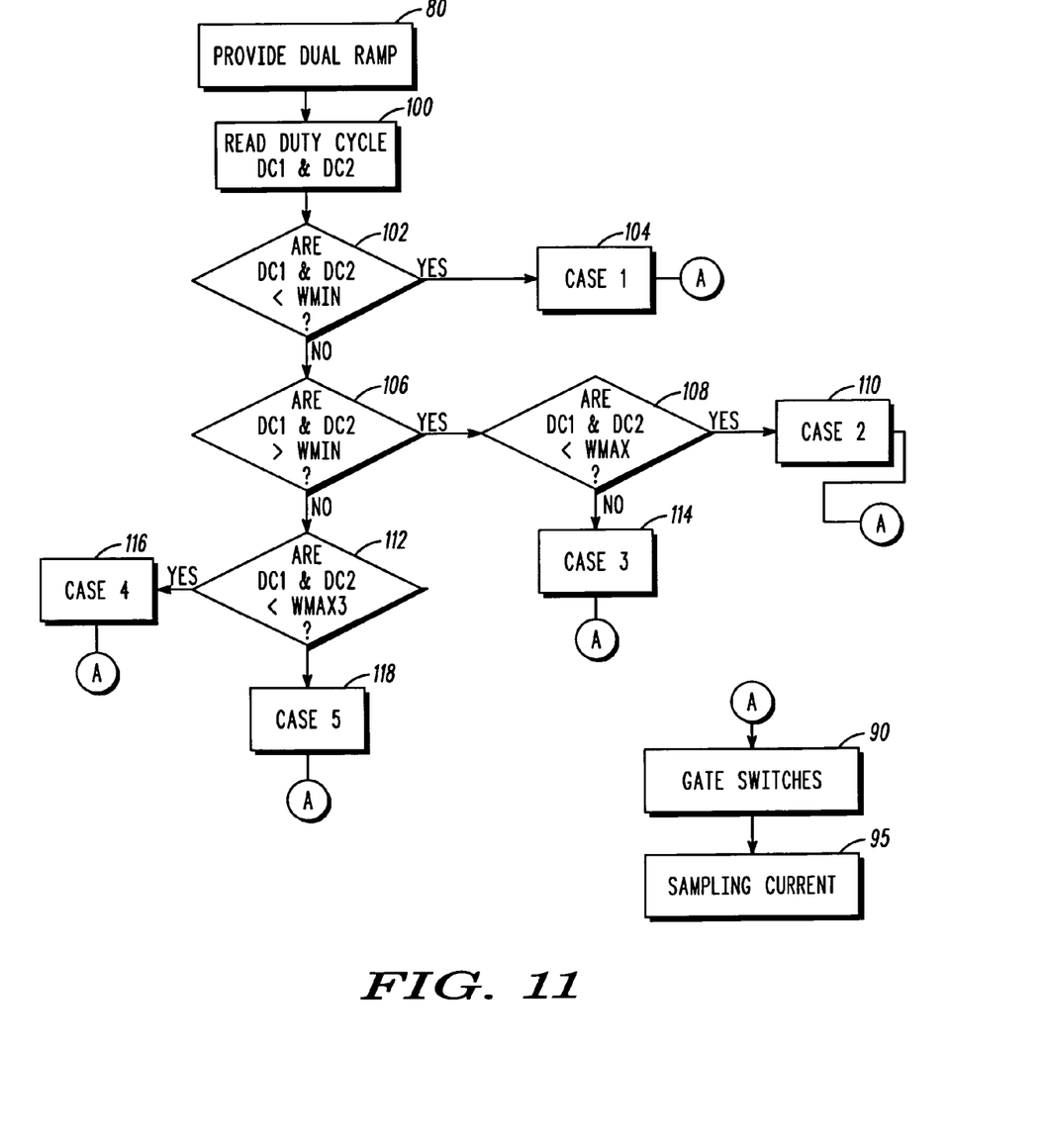
FIG. 11 is a flow chart for measuring current of a two-phase motor, in accordance with the present invention.

Generally, and referring to FIG. 11, the present invention describes a method for measuring the current in each phase of a two-phase motor by a single sensor, the motor being controlled by a plurality of switching devices that receive pulse width modulation signals from a controller. A first step 80 includes providing two ramp signals for a pulse width modulation controller for controlling the switches. The ramp signals being approximately one half cycle out of phase, with the first ramp signal for controlling the first set of switches and the second ramp signal for controlling the second set of switches. The dual ramp signals ensure that the distribution of pulses used to control one winding are approximately one-half of a PWM cycle away from the pulse distribution for the other winding.

A next step 90 includes gating the first and second set of switches using the respective ramp signals. This results in a first voltage pulse train Vab, and second voltage pulse train Vcd associated with the two windings W1, W2 of the motor, respectively. The Vab and Vcd pulse trains provide a relative timing offset of approximately one-half cycle between the pulse width modulation signals driving the first and second windings of the motor.

A next step includes the reading 100 a modulation index (i.e. duty cycle) for the pulse width modulation signals for one pulse width modulation cycle from a motor drive control. In other words, this step reads a first duty cycle of a first drive signal for the first winding and a second duty cycle of a second drive signal for the second winding. The method then uses the modulation index to determine how to when and how to modify the voltage pulse trains. First and second sampling windows are time periods defined within pulse train of the cycle that may allow certain current measurements to be taken. Preferably, measurement samples are taken in the middle of a sampling window. For adequate current measurement, these windows should be greater than a minimum window, Wmin. For control purposes, at least one of these windows should be less than 100%–Wmin, or Wmax. A next step includes configuring 104, 110, 114, 116, 118 the timing of the pulse width modulation signals to provide at least one timing window wherein at least one of the windings of the motor is being driven while the other winding is not being driven, such that a single current sensor can sample the current of the at least one of the windings during the at least one timing window.

In a first embodiment 104, when both the first and second sampling windows are less than the minimum sampling window (resulting in no overlapping) 102, artificial voltage vectors are introduced to add to the sampling period for both Vab and Vcd to provide sufficient sampling time. For example, for Vab, artificial and adjacent vectors 1000 and 0100 vectors are introduced to provide at least one sample for i1 (as was demonstrated for Vab in FIG. 8). This is also the case where Vab is non-existent (Vab has zero duty cycle), with artificial vector 1000 being added to the existing 1000 vector and vector 0100 being placed adjacent (similar to what was demonstrated for Vcd in FIG. 10). For Vcd, artificial and adjacent vectors 0010 and 0001 vectors are introduced to add to the sampling period to provide at least one sample for i2 (similar to what was demonstrated for Vab in FIG. 8). This is also the case where Vcd is non-existent (Vcd has zero duty cycle), with artificial vector 0010 being added to the existing 0010 vector and vector 0001 being placed adjacent (as was demonstrated for Vcd in FIG. 10).

In a second embodiment 110, when both sampling windows are greater than Wmin 106, and both sampling windows are less than Wmax 108, no artificial vectors need be introduced since i1 and i2 are isolated and can be sampled individually. For example, for Vab, i1 can be sampled during vector 1000 (as was demonstrated for Vab in FIG. 10), and for Vcd, i2 can be sampled during vectors 0010 (as was demonstrated for Vcd in FIG. 8).

In a third embodiment 114, when both sampling windows are greater than Wmin 106, and the first sampling window is greater than Wmax, and the second sampling window is less than Wmax 108, the current of the first sample can not be obtained, but the current of the second sample can be obtained by itself. In this case, the first sample will contain the sum of the winding currents, and the second current is subtracted from this sum to obtain the first current (as was demonstrated in FIG. 9).

In a fourth embodiment 116, when the first sampling window is less than Wmin, and the second sampling window is greater than Wmin 106, and both sampling windows are less than 100%–3*Wmin (hereinafter Wmax3) 112, than artificial vectors are introduced for the first sampling window (e.g. Vcd) to provide sufficient sampling time. For example, for Vcd, artificial, extended (3×), and adjacent vectors 0010 and 0001 vectors can be introduced to add to the sampling period to provide at least one sample for i2 (as was demonstrated for FIG. 10). For Vab, artificial, extended (3×), and adjacent vectors 1000 and 0100 vectors can be introduced to add to the sampling period to provide at least one sample for i1 (as was demonstrated for Vcd in FIG. 10).

Figure 12:
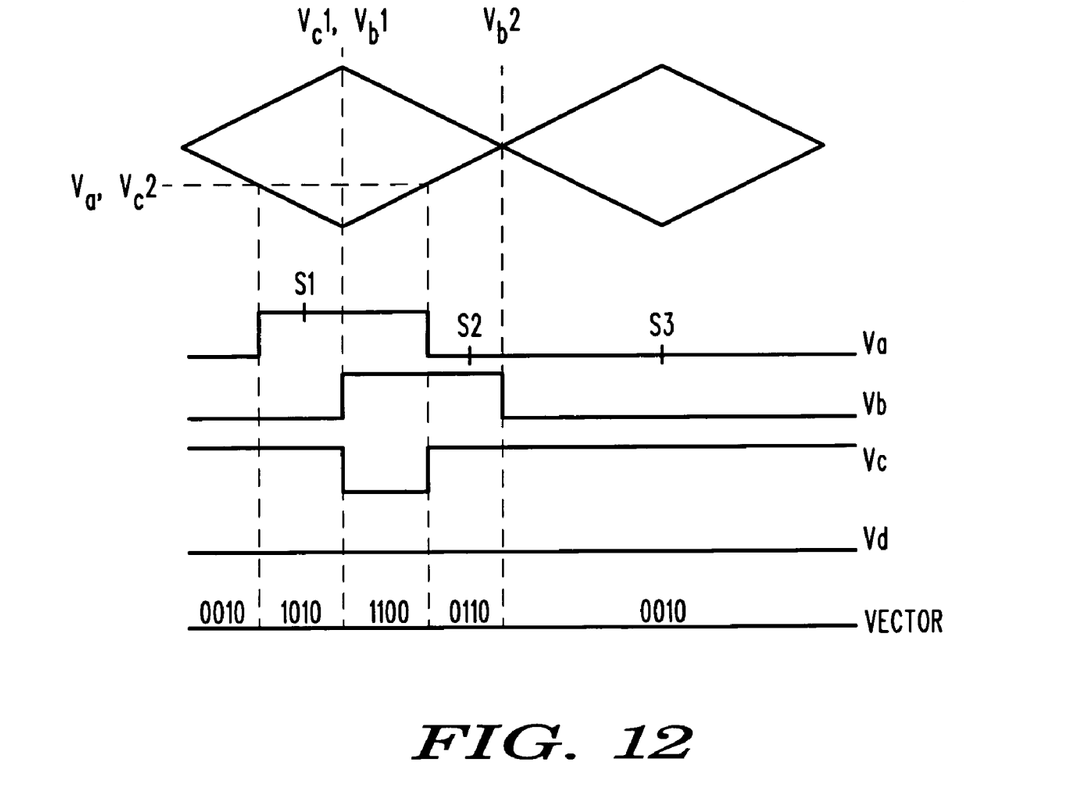
FIG. 12 is a graphical representation of another PWM embodiment, in accordance with the present invention.

In a fifth embodiment 118, when the first sampling window is less than Wmin, and the second sampling window is greater than Wmin 106, and at least one of the sampling windows is greater than 100%–3*Wmin 112, then artificial vectors are introduced for the first sampling window (e.g. Vcd) to provide sufficient sampling time. For example, for Vab less than Wmin, artificial and adjacent vectors 1011 and 0111 vectors are introduced to add to the sampling period to provide at least one sample for i1 (as was demonstrated for FIG. 7 wherein the W2-11 vector is introduced along with the two active W1 vectors). This is subtracted from the second sample, which contains the sum of the currents, to obtain the sample for i2. As shown in FIG. 12, i1=((S1−i2)−(S2−i2))/2 so i1=(S1−S2)/2. Alternatively, another option is to create a sub-case where the W2 null vector (11) is aligned with only one of the two introduced W1 vectors.

In a preferred embodiment, the present invention also provides technique for abnormal operation for the motor. For example, if one of the windings is shorted (or the associated switches shorted) and turned OFF, breaking torque for the motor will come from free-wheeling, recirculating current only. However, it will still be possible to use the common shunt current sensor to read the current from the other good winding. In addition, is desirable that the controller incorporate delay compensation between the controller and the power stage. This will provide compensation for the propagation delay between these stages.

After one of the above embodiments is performed, depending on the determined duty cycle, a next step 90 includes gating the first and second set of switches using the respective ramp signals in accordance with the modifications of selected embodiment above. A final step 95 includes sampling the current in at least one of the windings in the defined sampling windows to determine the current in both windings, as detail previously.

What has been described is an improved procedure for measuring current flowing in a two-phase device with a single current sensor external to the motor. The above-described procedure modifies existing PWM operation based on specific cases. The procedure involves monitoring currents in a motor phase over very short periods. It should be recognized that switching devices other than FETs can be used. However, in that case, external diodes are added to replicate FET body diodes so that the operation of the present inventions is the same as that with FETs.

The above description of the present invention is intended to be exemplary only and is not intended to limit the scope of any patent issuing from this application. For example, the present discussion used a two-phase motor. The present invention is also applicable to other separate devices, two-phase devices, or multi-phase devices where pulse width modulation is used. The present invention is intended to be limited only by the broad scope of the following claims.

What is claimed is:

1. A method for measuring current by a single sensor for a two-phase motor, drive current to the two phases switched by a first set of upper and lower switches to drive a first phase of a motor and a second set of upper and lower switches to drive a second phase of a motor, with the switches being controlled by a plurality of pulse width modulation signals, the method comprising the steps of: reading a duty cycle of each drive current to a respective winding; providing two ramp signals for a pulse width modulation controller for controlling the switches, the ramp signals being approximately one half cycle out of phase, the first ramp signal for controlling the first set of switches and the second ramp signal for controlling the second set of switches; configuring the pulse width modulation signals to provide at least one timing window wherein at least one of the windings of the motor is being driven while the other winding is not being driven, and to provide a relative timing offset of approximately one-half cycle between the pulse width modulation signals driving a first winding and a second winding of the motor; gating the first and second set of switches using the respective ramp signals from the configuring step; and sampling the current of the at least one of the windings during the at least one timing window.

2. The method of claim 1, wherein the configuring step includes determining whether the first and second ramp signals are both less than a minimum sampling period, wherein artificial voltage vectors are introduced to provide sufficient sampling time for at least one of the sampling windows.

3. The method of claim 1, wherein the configuring step includes determining whether the first and second ramp signals are greater than a minimum sampling period and less than a maximum sampling window, wherein each sampling window can be sampled to provide isolated currents for respective windings.

4. The method of claim 1, wherein the configuring step includes determining whether the first and second ramp signals are greater than a minimum sampling period and only the second ramp signals is less than a maximum sampling window, wherein a first sampling window is sampled for a sum of the first and second winding currents and the second sampling window is sampled for the isolated second winding current, which is subtracted from the sampled sum to obtain the first winding current.

5. The method of claim 1, wherein the configuring step includes determining whether only the first ramp signals is less than a minimum sampling period and both ramp signals are less than 100%−(3*the minimum sampling period), wherein artificial active voltage vectors are added to the first sampling period to obtain the first winding current.

6. The method of claim 1, wherein the configuring step includes determining whether only the first ramp signal is less than a minimum sampling period and at least one of the ramp signals is less than 100%−(3*the minimum sampling period), wherein artificial active voltage vectors are added to the first sampling period to obtain the first winding current, which is subtracted from the second sample that includes a sum of the two currents, to obtain the second winding current.

* * * * *